(12) United States Patent
Didier et al.

(10) Patent No.: US 9,388,071 B2
(45) Date of Patent: Jul. 12, 2016

(54) FORMALDEHYDE-FREE SIZING COMPOSITION FOR FIBRES, IN PARTICULAR MINERAL FIBRES, AND RESULTING PRODUCTS

(75) Inventors: Benoit Didier, Liège (BE); Fabio Foti, Paris (FR); Edouard Obert, Fleurines (FR); Boris Jaffrennou, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 57 days.

(21) Appl. No.: 14/119,597

(22) PCT Filed: May 25, 2012

(86) PCT No.: PCT/FR2012/051182
§ 371 (c)(1),
(2), (4) Date: Dec. 18, 2013

(87) PCT Pub. No.: WO2012/168619
PCT Pub. Date: Dec. 13, 2012

(65) Prior Publication Data
US 2014/0120348 A1   May 1, 2014

(30) Foreign Application Priority Data
May 25, 2011  (FR) ...................... 11 54547

(51) Int. Cl.
| | | |
|---|---|---|
| *C03C 25/26* | (2006.01) | |
| *C03C 25/34* | (2006.01) | |
| *D04H 1/64* | (2012.01) | |
| *D04H 3/12* | (2006.01) | |
| *D06M 13/50* | (2006.01) | |
| *D06M 13/53* | (2006.01) | |

(52) U.S. Cl.
CPC ............... *C03C 25/26* (2013.01); *C03C 25/34* (2013.01); *D04H 1/64* (2013.01); *D04H 3/12* (2013.01); *D06M 13/50* (2013.01); *D06M 13/53* (2013.01); *Y10T 428/2958* (2015.01)

(58) Field of Classification Search
CPC .......... C03C 25/26; C03C 25/34; D04H 1/64; D04H 3/12; D06M 13/50; D06M 13/53; Y10T 428/295
USPC ................... 106/162.1; 252/8.83, 62
See application file for complete search history.

(56) References Cited

U.S. PATENT DOCUMENTS

| | | | |
|---|---|---|---|
| 5,318,990 A | 6/1994 | Strauss | |
| 5,340,868 A | 8/1994 | Strauss et al. | |
| 5,661,213 A | 8/1997 | Arkens et al. | |
| 5,895,804 A | 4/1999 | Lee et al. | |
| 5,932,689 A | 8/1999 | Arkens et al. | |
| 5,977,232 A | 11/1999 | Arkens et al. | |
| 6,071,994 A | 6/2000 | Hummerich et al. | |
| 6,099,773 A | 8/2000 | Reck et al. | |
| 6,146,746 A | 11/2000 | Reck et al. | |
| 6,299,936 B1 | 10/2001 | Reck et al. | |
| 6,331,350 B1 | 12/2001 | Taylor et al. | |
| 2002/0188055 A1 | 12/2002 | Chen et al. | |
| 2003/0008978 A1 | 1/2003 | Chen et al. | |
| 2004/0002567 A1 | 1/2004 | Chen et al. | |
| 2005/0215153 A1 | 9/2005 | Cossement et al. | |
| 2008/0108741 A1* | 5/2008 | Van Herwijnen | C03C 25/26 524/443 |
| 2010/0282996 A1* | 11/2010 | Jaffrennou et al. | 252/8.83 |
| 2011/0086567 A1* | 4/2011 | Hawkins et al. | 442/327 |

FOREIGN PATENT DOCUMENTS

| | | | | |
|---|---|---|---|---|
| DE | 43 08 089 | 9/1994 | | |
| EP | 1 382 642 | 1/2004 | | |
| WO | WO 2007/014236 | 2/2007 | | |
| WO | WO 2008/043960 | 4/2008 | | |
| WO | WO 2009/019232 | 2/2009 | | |
| WO | WO 2009/019235 | 2/2009 | | |
| WO | WO 2009/080938 | 7/2009 | | |
| WO | WO 2010106181 A1 * | 9/2010 | | ............. C03C 25/24 |
| WO | WO 2010/139899 | 12/2010 | | |
| WO | WO 2011/019590 | 2/2011 | | |
| WO | WO 2011/019593 | 2/2011 | | |
| WO | WO 2011/019597 | 2/2011 | | |
| WO | WO 2011/019598 | 2/2011 | | |
| WO | WO 2011138458 A1 * | 11/2011 | | ............. C08G 12/00 |

OTHER PUBLICATIONS

International Search Report as issued for International Application No. PCT/FR2012/051182, dated Aug. 22, 2012.

* cited by examiner

*Primary Examiner* — Anthony J Green
(74) *Attorney, Agent, or Firm* — Pillsbury Winthrop Shaw Pittman LLP

(57) ABSTRACT

A formaldehyde-free sizing composition for products based on fibers, in particular mineral fibers, such as glass or rock fibers, which includes at least one reducing sugar, at least one inorganic acid metal salt, at least one amine, and at least one compound including activated ethylenic unsaturation(s), the inorganic acid metal salt being present in an amount at least equal to 1% of the weight of the reducing sugar.

11 Claims, 1 Drawing Sheet

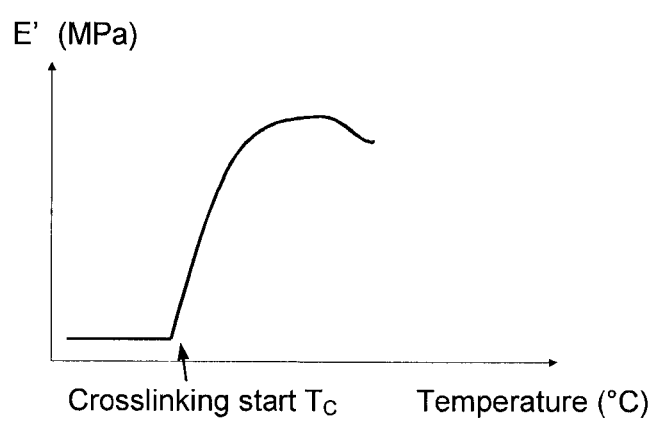

FORMALDEHYDE-FREE SIZING COMPOSITION FOR FIBRES, IN PARTICULAR MINERAL FIBRES, AND RESULTING PRODUCTS

CROSS-REFERENCE TO RELATED APPLICATIONS

This application is the U.S. National Stage of PCT/FR2012/051182, filed May 25, 2012, which in turn claims priority to French Application No. 1154547, filed May 25, 2011. The content of both applications are incorporated herein by reference in their entirety.

The present invention relates to the field of products based on fibres, in particular mineral fibres, bonded by a formaldehyde-free binder.

Very particularly, the invention relates to thermal and/or acoustic insulating products, the fibres of which are in the form of mineral wool, in particular of glass or of rock.

The manufacture of insulating products based on mineral wool generally comprises a stage of manufacture of the wool itself, which can be carried out by various processes, for example according to the known technique of fiberizing by internal or external centrifugation.

Internal centrifugation consists in introducing the molten material (generally glass or a rock) into a centrifugal device comprising a multitude of small orifices, the material being projected toward the peripheral wall of the device under the action of the centrifugal force and escaping therefrom in the form of filaments. On leaving the centrifugal device, the filaments are drawn and carried toward a receiving member by a gas stream having a high temperature and a high speed, in order to form a web of fibres (or mineral wool).

External centrifugation consists, for its part, in pouring out the molten material at the external peripheral surface of rotating members, known as rotors, from where the said material is ejected under the action of the centrifugal force. Means for drawing by gas stream and for collecting on a receiving member are also provided.

In order to provide for the assembly of the fibres together and to make it possible for the web to have cohesion, a sizing composition comprising a thermosetting resin is applied to the fibres, on the route between the outlet of the centrifugal device and the receiving member. The web of fibres coated with the size is subjected to a heat treatment, at a temperature generally of greater than 100° C., in order to bring about the polycondensation of the resin and to thus obtain a thermal and/or acoustic insulating product having specific properties, in particular dimensional stability, tensile strength, thickness recovery after compression and homogeneous colour.

The sizing composition to be projected onto the mineral wool is generally provided in the form of an aqueous solution including the thermosetting resin and additives, such as a catalyst for the crosslinking of the resin, an adhesion-promoting silane, a dust-preventing mineral oil, and the like. The sizing composition is generally applied to the fibres by spraying.

The properties of the sizing composition depend largely on the characteristics of the resin. From the viewpoint of the application, it is necessary for the sizing composition to exhibit good sprayability and to be able to be deposited at the surface of the fibres in order to efficiently bind them.

The resin has to be stable for a given period of time before being used to form the sizing composition, which composition is generally prepared at the time of use by mixing the resin and the additives mentioned above.

At the regulatory level, it is necessary for the resin to be regarded as non-polluting, that is to say for it to comprise—and for it to generate during the sizing stage or subsequently—as small an amount as possible of compounds which may be harmful to human health or to the environment.

The thermosetting resins most commonly used are phenolic resins belonging to the family of the resols. In addition to their good crosslinkability under the abovementioned thermal conditions, these resins are soluble in water, have a good affinity for mineral fibres, in particular glass fibres, and are relatively inexpensive.

These resols are obtained by condensation of phenol and formaldehyde, in the presence of a basic catalyst, in a formaldehyde/phenol molar ratio of greater than 1, so as to promote the reaction between the phenol and the formaldehyde and to reduce the level of residual phenol in the resin. The condensation reaction between the phenol and the formaldehyde is carried out while limiting the degree of condensation of the monomers, in order to avoid the formation of long, relatively water-insoluble, chains which reduce the dilutability. Consequently, the resin comprises a certain proportion of unreacted monomer, in particular formaldehyde, the presence of which is undesirable because of its known harmful effects.

For this reason, resol-based resins are generally treated with urea, which reacts with the free formaldehyde by trapping it in the form of nonvolatile urea-formaldehyde condensates. The presence of urea in the resin in addition brings a certain economic advantage as a result of its low cost because it is possible to introduce it in a relatively large amount without affecting the operating qualities of the resin, in particular without harming the mechanical properties of the final product, which significantly lowers the total cost of the resin.

Nevertheless, it has been observed that, under the temperature conditions to which the web is subjected in order to obtain crosslinking of the resin, the urea-formaldehyde condensates are not stable; they decompose with restoration of the formaldehyde and urea (in its turn at least partially decomposed to give ammonia), which are released into the atmosphere of the factory.

Regulations with regard to environmental protection, which are becoming more restrictive, are forcing manufacturers of insulating products to look for solutions which make it possible to further lower the levels of undesirable emissions, in particular of formaldehyde.

Solutions in which resols are replaced in sizing compositions are known.

A first solution is based on the use of a carboxylic acid polymer, in particular an acrylic acid polymer.

In U.S. Pat. No. 5,340,868, the size comprises a polycarboxylic polymer, a β-hydroxyamide and an at least trifunctional monomeric carboxylic acid.

Other sizing compositions have been provided which comprise a polycarboxylic polymer, a polyol and a catalyst, this catalyst being able to be a phosphorus-comprising compound (U.S. Pat. No. 5,318,990, U.S. Pat. No. 5,661,213, U.S. Pat. No. 6,331,350, US 2003/0008978), a fluoroborate (U.S. Pat. No. 5,977,232) or else a cyanamide, a dicyanamide or a cyanoguanidine (U.S. Pat. No. 5,932,689).

The sizing compositions based on a polycarboxylic polymer and on a polyol can additionally comprise a cationic, amphoteric or nonionic surfactant (US 2002/0188055), a coupling agent of silane type (US 2004/0002567) or a dextrin as cobinder (US 2005/0215153).

A description has also been given of sizing compositions comprising an alkanolamine including at least two hydroxyl groups and a polycarboxylic polymer (U.S. Pat. No. 6,071, 994, U.S. Pat. No. 6,099,773, U.S. Pat. No. 6,146,746) in combination with a copolymer (U.S. Pat. No. 6,299,936).

A second solution in which resols are replaced is based on the combination of a saccharide and a polycarboxylic acid.

In U.S. Pat. No. 5,895,804, a description is given of an adhesive composition based on heat-crosslinkable polysaccharides which can be used as size for mineral wool. The combination includes a polycarboxylic polymer having at least two carboxylic acid functional groups and a molecular weight at least equal to 1000, and a polysaccharide having a molecular weight at least equal to 10 000.

In WO 2009/080938, the sizing composition comprises a monosaccharide and/or a polysaccharide and an organic polycarboxylic acid with a molar mass of less than 1000.

A formaldehyde-free aqueous sizing composition which comprises a Maillard reaction product, in particular combining a reducing sugar, a carboxylic acid and aqueous ammonia (WO 2007/014236), is also known. In WO 2009/019232 and WO 2009/019235, the proposal is made to substitute, for the carboxylic acid, an acid precursor derived from an inorganic salt, in particular an ammonium salt, which exhibits the additional advantage of being able to replace all or part of the aqueous ammonia.

In WO 2011/019590 and WO 2011/019597, a description is given of an insulating mat based on glass fibres which can be used in roofing. The fibres are bonded by a sizing composition which comprises an inorganic acid salt and an aldehyde or a ketone. The inorganic acid salt is obtained by reaction of an inorganic acid and aqueous ammonia or a polyamine.

In WO 2011/019593 and WO 2011/019598, the abovementioned insulating mat is obtained from a sizing composition which comprises an amino amide and an aldehyde or a ketone. The amino amide is obtained by reaction of a polyfunctional primary or secondary amine and a saturated or unsaturated reactant, such as a carboxylic acid, an acid anhydride or a derivative (ester or a salt) of these compounds.

There exists a need to have available novel formaldehyde-free sizing compositions which make it possible to manufacture products based on fibres, in particular mineral fibres, which can be used as acoustic and/or thermal insulators.

The aim of the present invention is to provide an alternative to the formaldehyde-free sizing compositions for fibres, in particular mineral fibres.

This aim is achieved by the sizing composition in accordance with the invention, which comprises:
at least one reducing sugar,
at least one inorganic acid metal salt,
at least one amine,
and at least one compound comprising activated ethylenic unsaturation(s),
the inorganic acid metal salt being present in an amount at least equal to 1% of the weight of the reducing sugar.

The reducing sugar in accordance with the present invention is an oligosaccharide including from 1 to 10 saccharide units, preferably at most 5.

Mention may be made, as examples of monosaccharides, such as glucose, galactose or mannose, or disaccharides, such as fructose, lactose, maltose, isomaltose and cellobiose. Preference is given to glucose and fructose, advantageously to glucose.

The inorganic acid metal salt act as agent for the dehydration of the reducing sugar and it must make possible the formation of a system comprising at least two conjugated ethylenic bonds.

The inorganic acid metal salt is chosen from inorganic acid alkali metal, alkaline earth metal, transition metal and poor metal salts. Preferably, it is a sodium, magnesium, iron, cobalt, nickel, copper, zinc or aluminium salt, advantageously a copper, iron(II), aluminium or zinc salt.

The inorganic acid metal salt is preferably chosen from sulphates, chlorides, nitrates, phosphates and carbonates and advantageously from sulphates and chlorides.

Preference is given to copper sulphate, iron(II) sulphate, zinc sulphate, aluminium sulphate, potassium aluminium sulphate (or potassium alum) and aluminium chloride, in particular to copper sulphate and aluminium sulphate.

In the sizing composition, the amount of inorganic acid metal salt represents at most 30% of the weight of the reducing sugar, preferably from 5 to 25% and advantageously from 10 to 20%.

The amine in accordance with the invention corresponds to the following formula (I):

$$R\text{-}A\text{-}NHR_1 \quad (I)$$

in which:
R is equal to H, OH, $NHR_1$ or $-NR_1$,
A represents an optionally branched alkylene, arylalkylene, arylene or alkylarylene group, a —CO— group or a group of following formula (II):

$$-(CH_2)_x-\!\!\left[X-(CH_2)_y\right]_{\overline{n}}-$$

in which:
X is equal to —O— or $-NR_2-$
with $R_2$ equal to H, $-(CH_2)_z-NH_2$ or a divalent $-(CH_2)_t-$ group which forms, with a neighbouring nitrogen atom, a ring comprising 6 atoms,
x, y, z and t vary from 1 to 5, preferably x=y=z=t=2,
n is equal to 1, 2, 3 or 4,
$R_1$ is a hydrogen atom or a $C_1$ to $C_5$ hydroxyalkyl group, preferably a hydroxyethyl group.

Mention may be made, as examples of such amines, of monoethanolamine, diethanolamine, urea, diethylenetriamine (DETA), triethylenetetramine (TETA), tetraethylenepentamine (TEPA), pentaethylenehexamine (PEHA), aminoethyltriethylenetetramine (AETETA), N"-(aminoethyl)tetraethylenepentamine and N'-(aminoethyl)tetraethylenepentamine (AETEPA), bis(piperazine)ethylene (BISPIP), aminoethylpiperazinylethylethylenediamine (AEPEEDA), piperazinylethyldiethylenetriamine (PEDETA), aminoethylpiperazinylethyldiethylenetriamine (AEPEDETA), piperazinylethyltriethylenetetramine (PETETA), tris(aminoethyl)aminoethylpiperazine (TRISAEAEP) and piperazinylethylaminoethyldiethylenetriamine (PEAEDETA).

Preferably, the amine is urea, diethylenetriamine (DETA), triethylenetetramine (TETA), tetraethylenepentamine (TEPA) and the mixtures of abovementioned amines in which TEPA is predominant, and advantageously TEPA and the abovementioned mixtures.

The term "compound comprising activated ethylenic unsaturation(s)" is understood to mean a compound which includes at least one system of following formula (III):

$$\underset{/}{\overset{\diagdown}{C}}=\underset{\diagdown}{\overset{/}{C}}\underset{\underset{O}{\parallel}}{\overset{}{C}}\diagup \quad (III)$$

The preferred compound comprising activated ethylenic unsaturation(s) corresponds to the following formula (IV):

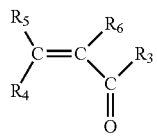

in which:
- $R_3$ represents a hydrogen atom, a $C_1$-$C_5$, preferably $C_1$-$C_2$, alkyl group, a hydroxyl group or a $C_1$-$C_5$, preferably $C_1$-$C_2$, alkoxy group,
- $R_4$ and $R_5$, which are identical or different, represent a hydrogen atom, a $C_1$-$C_5$, preferably $C_1$-$C_2$, alkyl group or a —CO—$R_3$ group,
- $R_6$ represents a hydrogen atom or a hydrocarbon chain which can include one or more heteroatoms, in particular O, S, N and P, especially a $C_2$-$C_5$, preferably $C_2$, carboxyalkylene radical.

The compounds comprising activated ethylenic unsaturation(s) which are particularly preferred are acrylic acid, methacrylic acid, crotonic acid, fumaric acid, maleic acid, citraconic acid, itaconic acid and the anhydrides of these acids.

The amount of amine in the composition is such that the molar ratio of the compound comprising activated ethylenic unsaturation(s) to the amine varies from 1 to 3.5, preferably from 1.5 to 3 and advantageously from 2 to 2.5.

In the same way, the amount of compound comprising activated ethylenic unsaturation(s) in the composition is such that the molar ratio of this compound to the sum of the constituent saccharide units of the non-reducing sugar varies from 0.05 to 1.5, preferably from 0.1 to 1.3 and advantageously from 0.2 to 1.1. In the present case, the molar mass of the corresponding saccharide compound is taken as molar mass of each saccharide unit.

The sizing composition can comprise, in addition to the compounds mentioned, the conventional additives below in the following proportions, calculated on the basis of 100 parts by weight of reducing sugar, inorganic acid metal salt, amine and compound comprising activated ethylenic unsaturation(s):
- from 0 to 2 parts of silane, in particular an aminosilane,
- from 0 to 20 parts of oil, preferably from 4 to 15 parts,
- from 0 to 5 parts of a silicone,
- from 0 to 30 parts of an "extender".

The role of the additives is known and briefly restated: the silane is an agent for coupling between the fibres and the binder, and also acts as anti-ageing-agent; the oils are dust-preventing and hydrophobic agents; the silicone is a hydrophobic agent having the role of reducing the absorption of water by the insulating product; the "extender" is an organic or inorganic filler, soluble or dispersible in the sizing composition, which makes it possible in particular to reduce the cost of the sizing composition.

The sizing composition exerts a pH which varies according to the nature of the inorganic acid metal salt and the compound comprising activated ethylenic unsaturation(s) which are used, but it is generally at most equal to 9 and advantageously varies from 3 to 7.

The various constituents present in the sizing composition react under the effect of heat to form a polymeric network which constituents the final binder. When the temperature increases, the inorganic acid metal salt brings about dehydration of the reducing sugar, which is reflected by the appearance of at least two conjugated ethylenic bonds, these bonds reacting with the other constituents of the sizing composition, in particular with the compound comprising activated ethylenic unsaturation(s) and/or another dehydrated reducing sugar. The polymer network thus formed makes it possible to establish bonds between the mineral fibres, in particular at the junctions of the fibres in the mineral wool, which confers a degree of "elasticity" on the final product capable of ensuring in particular good thickness recovery after the product has been unpacked.

The sizing composition according to the invention is intended to be applied to fibres which can be mineral or organic, or also to a mixture of mineral and organic fibres.

As already indicated, the mineral fibres can be glass fibres, in particular fibres of E, C, R or AR (alkali-resistant) glass, or rock fibres, in particular of basalt (or wollastonite). These fibres can also be fibres including 96% by weight of silica and ceramic fibres based on at least one oxide, nitride or carbide of metal or semimetal, or on a mixture of these compounds, in particular on at least one oxide, nitride or carbide of aluminium, zirconium, titanium, boron or yttrium.

The organic fibres can be synthetic fibres or natural fibres.

Mention may be made, as examples of synthetic fibres, of fibres based on an olefin, such as polyethylene and polypropylene, on a polyalkylene terephthalate, such as polyethylene terephthalate, or on a polyester.

Mention may be made, as examples of natural fibres, of plant fibres, in particular fibres of wood, cellulose, cotton, coconut, sisal, hemp or flax, and animal fibres, in particular wool.

As already mentioned, the sizing composition is more particularly used as sizing composition for thermal and/or acoustic insulation products based on mineral wool.

Conventionally, the sizing composition is applied to the mineral fibres at the outlet of the fiberizing device and before they are collected on the receiving member in the form of a web of fibres which is subsequently treated at a temperature which makes possible the crosslinking of the size and the formation of an infusible binder. The crosslinking of the size according to the invention takes place at a temperature of the order of 100 to 200° C., generally at a temperature comparable to that of a conventional formaldehyde-phenol resin, in particular of greater than or equal to 110° C., preferably of less than or equal to 170° C.

The products based on fibres sized using the composition, in particular the acoustic and/or thermal insulating products obtained from these sized fibres, also constitute a subject-matter of the present invention.

These products are generally provided in the form of a mat, a felt, panels, blocks, shells or other moulded forms based on mineral wool, of glass or of rock.

The sizing composition can also be used to manufacture coated or impregnated fabrics or veils (also known as "nonwovens"), in particular based on mineral fibres, such as fibres of glass or of rock.

The veils of mineral fibres are used in particular as surface coating for thermal and/or acoustic insulating products based on mineral wool or a foam.

Another subject-matter of the invention is a process for the manufacture of a thermal and/or acoustic insulating product based on mineral wool or of a veil of mineral fibres, according to which the mineral wool or the mineral fibres is/are manufactured, a composition according to the invention is applied to the said wool or the said fibres and the said wool or the said fibres is/are treated at a temperature which makes possible the crosslinking of the size and the formation of an infusible binder, for example under the thermal conditions described above.

BRIEF DESCRIPTION OF THE DRAWINGS

FIG. 1 shows the variation in the modulus of elasticity E' as a function of temperature in accordance with an embodiment.

The size can be applied by any appropriate means, for example by projection, spraying, atomization, coating or impregnation.

The following examples make it possible to illustrate the invention without, however, limiting it.

In these examples, the following are measured:
the crosslinking start temperature ($T_C$) by the Dynamic Mechanical Analysis (DMA) method, which makes it possible to characterize the viscoelastic behaviour of a polymeric material. The procedure is as follows: a sample of Whatman paper is impregnated with the sizing composition (content of organic solids of the order of 30%) and is then fixed horizontally between two jaws. An oscillating component equipped with a device for measuring the stress as a function of the strain applied is positioned on the upper face of the sample. The device makes it possible to calculate the modulus of elasticity E'. The sample is heated to a temperature varying from 20 to 250° C. at the rate of 4° C./min. The curve of variation in the modulus of elasticity E' (in MPa) as a function of the temperature (in ° C.) is plotted from the measurements, the general appearance of the curve being given in FIG. 1. The value of the crosslinking start temperature ($T_C$), in ° C., is determined on the curve.
the tensile strength according to Standard ASTM C 686-71T on a sample cut out by stamping from the insulating product. The sample has the shape of a torus with a length of 122 mm, a width of 46 mm, a radius of curvature of the cut-out of the outer edge equal to 38 mm and a radius of curvature of the cut-out of the inner edge equal to 12.5 mm.

The sample is positioned between two cylindrical mandrels of a test machine, one of which is movable and is moved at a constant rate. The breaking force F (in newtons) of the sample is measured and the tensile strength TS, defined by the ratio of the breaking force F to the weight of the sample, is calculated (N/g).

The tensile strength is measured after manufacture (initial tensile strength) and after accelerated ageing in an autoclave at a temperature of 105° C. under 100% relative humidity for 15 minutes (TS 15).
the initial thickness of the insulating product and the thickness after compressing for 1 hour and 30 days with a degree of compression (defined as being the ratio of the nominal thickness to the thickness under compression) equal to 4.8/1. The thickness measurements make it possible to evaluate the dimensional behaviour of the product.
the thermal conductivity coefficient λ according to Standard EN 13162, expressed in W/(m×K).

EXAMPLES 1 TO 26

Sizing compositions are prepared which comprise the constituents appearing in Table 1, expressed as parts by weight:
a) the compound comprising activated ethylenic unsaturation(s) and the amine are mixed beforehand in a first container and the mixture is left at a temperature of the order of 20 to 25° C. for 15 minutes,
b) the sizing compositions are prepared by introducing, into a second container containing water, the reducing sugar, the inorganic acid metal salt and the mixture obtained in a) with stirring until the constituents are completely dissolved.

The performance of a sizing composition comprising 82 parts by weight of a phenol-formaldehyde-monoethanolamine resin (Example 1 of WO 2008/043960) and 20 parts by weight of urea (Ref.) is also shown in Table 1.

Examples 8, 11, 12 15, 20 and 26 exhibit lower crosslinking start temperatures than the reference. However, the highest crosslinking start temperatures (Examples 10, 24 and 25) remain acceptable.

The examples using fructose (Examples 16 and 17) are very similar to those using glucose (Examples 1 and 8, respectively) with regard to the crosslinking start temperature.

Zinc sulphate (Example 15) makes it possible to reduce the crosslinking start temperature more effectively than iron(II) sulphate (Example 12) or copper sulphate (Example 8), and better still than aluminium sulphate (Example 1).

EXAMPLES 27 TO 33

These examples illustrate the manufacture of insulating products on an industrial line.

The sizing compositions of Examples 1 to 3 and the reference size (Ref.) are used to form products based on mineral wool exhibiting a nominal density equal to 17.5 kg/m$^3$ and a thickness equal to 75 mm. The content of binder (crosslinked size) represents 4.7% by weight of the product.

The sizing compositions A, B and C, comprising the following constituents (in % by weight), are also used:

|  | A | B | C |
|---|---|---|---|
| Glucose | 75.1 | 75.1 | 75.1 |
| Aluminium sulphate | 7.4 | — | — |
| Copper sulphate | — | 7.4 | — |
| Iron(II) sulphate | — | — | 7.4 |
| Tetraethylenepentamine (TEPA)$^{(1)}$ | 8.5 | 8.5 | 8.5 |
| Maleic anhydride | 9.0 | 9.0 | 9.0 |

Glass wool is manufactured on a pilot-scale line by the internal centrifugation technique in which the molten glass composition is converted into fibres by means of a tool, referred to as centrifuging disc, comprising a basket forming a chamber for receiving the molten composition and a peripheral band pierced by a multitude of orifices: the disc is rotated about its vertically positioned axis of symmetry, the composition is ejected through the orifices under the effect of the centrifugal force and the material escaping from the orifices is drawn into fibres with the assistance of a drawing gas stream.

Conventionally, a size spraying ring is positioned beneath the fiberizing disc so as to uniformly distribute the sizing composition over the glass wool which has just been formed.

The mineral wool, thus sized, is collected on a belt conveyor with a width of 2.4 m equipped with internal extraction boxes which hold the mineral wool in the form of a web at the surface of the conveyor. The web passes continuously through an oven maintained at 270° C., where the constituents of the size polymerize to form a binder. The amount of binder represents 4.7% by weight of the final insulating product.

The properties of the insulating products appear in Table 2.

The properties of the product are better when the sizing composition comprises a greater proportion of TEPA and maleic anhydride (Examples 27 to 29). The product of Example 27 is very close to that of the reference.

The properties of the product are better with copper sulphate (Example 30) than with aluminium sulphate (Example 31) and iron(II) sulphate (Example 32).

EXAMPLES 34 TO 41

These examples illustrate the manufacture of other insulating products on a pilot-scale line.

The sizing compositions having the constituents appearing in Table 3 and the reference size (Ref.) are used to form products exhibiting a nominal density equal to 10.6 kg/m$^3$ and a thickness equal to 144 mm. The content of binder (crosslinked size) represents 4.7% by weight of the product.

The mineral wool is obtained under the conditions of Examples 27 to 33 modified in that it is cut up before being introduced into an oven at 210° C. for 5 minutes and then the mineral wool is again placed in the oven, after having been turned upside down, for an additional 5 minutes.

The properties of the insulating products appear in Table 3.

The decrease in the amount of TEPA and maleic anhydride in the sizing composition reduces the product performance (Examples 36 to 38).

Aluminium sulphate (Example 36) is equivalent to copper sulphate (Example 39), but this tendency is reversed when the amount of TEPA and maleic anhydride is reduced (Examples 38 and 40).

EXAMPLES 42 TO 45

The procedure is carried out under the conditions of Examples 1 to 26, modified in that the sizing compositions comprise the constituents appearing in Table 4, expressed as parts by weight.

Examples 42 and 43 according to the invention exhibit a much lower crosslinking start temperature than the corresponding Comparative Examples 44 and 45, lower by 30 and 48° C. respectively.

The crosslinking start temperature of Example 45 is not compatible with the manufacturing conditions in an industrial line as it is far too high.

TABLE 1

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | Ref. |
| Sizing composition | | | | | | | | | | | | |
| Glucose | 64.0 | 76.0 | 85.5 | 68.0 | 76.6 | 64.0 | 64.0 | 64.0 | 76.0 | 85.5 | 62.0 | — |
| Fructose | — | — | — | — | — | — | — | — | — | — | — | — |
| Aluminium sulphate | 3.0 | 4.0 | 4.5 | 12.0 | 13.4 | 3.0 | 3.0 | — | — | — | — | — |
| Copper sulphate | — | — | — | — | — | — | — | 3.0 | 4.0 | 4.5 | 10.0 | — |
| Iron(II) sulphate | — | — | — | — | — | — | — | — | — | — | — | — |
| Zinc sulphate | — | — | — | — | — | — | — | — | — | — | — | — |
| Tetraethylenepentamine (TEPA)[1] | 16.2 | 9.8 | 4.9 | 9.8 | 4.9 | 18.6 | 14.4 | 16.2 | 9.8 | 4.9 | 13.7 | — |
| Triethylenetriamine (TETA) | — | — | — | — | — | — | — | — | — | — | — | — |
| Priamine ®[2] | — | — | — | — | — | — | — | — | — | — | — | — |
| Monoethanolamine | — | — | — | — | — | — | — | — | — | — | — | — |
| Diethanolamine | — | — | — | — | — | — | — | — | — | — | — | — |
| Urea | — | — | — | — | — | — | — | — | — | — | — | — |
| Maleic anhydride | 16.8 | 10.2 | 5.1 | 10.2 | 5.1 | 14.4 | 18.6 | 16.8 | 10.2 | 5.1 | 14.7 | — |
| Itaconic acid | — | — | — | — | — | — | — | — | — | — | — | — |
| Citraconic anhydride | — | — | — | — | — | — | — | — | — | — | — | — |
| Fumaric acid | — | — | — | — | — | — | — | — | — | — | — | — |
| Properties | | | | | | | | | | | | |
| Crosslinking start temp. $T_c$ (° C.) | 145 | 152 | 162 | 154 | 164 | 152 | 141 | 133 | 155 | 170 | 135 | 151 |
| pH[3] | 4.5 | 4.1 | 3.8 | n.d. | n.d. | 7.4 | 4.4 | 4.1 | 4.0 | 6.5 | 3.6 | 6.0 |

| | Example | | | | | | | | | |
|---|---|---|---|---|---|---|---|---|---|---|
| | 12 | 13 | 14 | 15 | 16 | 17 | 18 | 19 | 20 | Ref. |
| Sizing composition | | | | | | | | | | |
| Glucose | 64.0 | 68.0 | 76.6 | 64.0 | — | — | 64.0 | 59.7 | 59.7 | — |
| Fructose | — | — | — | — | 64.0 | 64.0 | — | — | — | — |
| Aluminium sulphate | — | — | — | — | 3.0 | — | 3.0 | 3.3 | 3.3 | — |
| Copper sulphate | — | — | — | — | — | 3.0 | — | — | — | — |
| Iron(II) sulphate | 3.0 | 12.0 | 13.4 | — | — | — | — | — | — | — |
| Zinc sulphate | — | — | — | 3.0 | — | — | — | — | — | — |
| Tetraethylenepentamine (TEPA)[1] | 16.2 | 9.8 | 4.9 | 16.2 | 16.2 | 16.2 | 16.2 | 16.0 | 16.0 | — |
| Triethylenetriamine (TETA) | — | — | — | — | — | — | — | — | — | — |
| Priamine ®[2] | — | — | — | — | — | — | — | — | — | — |
| Monoethanolamine | — | — | — | — | — | — | — | — | — | — |
| Diethanolamine | — | — | — | — | — | — | — | — | — | — |
| Urea | — | — | — | — | — | — | — | — | — | — |
| Maleic anhydride | 16.8 | 10.2 | 5.1 | 16.8 | 16.8 | 16.8 | — | — | — | — |
| Itaconic acid | — | — | — | — | — | — | — | 21.0 | — | — |
| Citraconic anhydride | — | — | — | — | — | — | — | — | 21.0 | — |
| Fumaric acid | — | — | — | — | — | — | 16.8 | — | — | — |
| Properties | | | | | | | | | | |
| Crosslinking start temp. $T_c$ (° C.) | 133 | 157 | 160 | 130 | 140 | 144 | 145 | 156 | 137 | 151 |
| pH[3] | 4.6 | n.d. | n.d. | 4.9 | 4.0 | 4.0 | 4.2 | 5.2 | 5.1 | 6.0 |

TABLE 1-continued

|  | Example |  |  |  |  |  |  |
|---|---|---|---|---|---|---|---|
|  | 21 | 22 | 23 | 24 | 25 | 26 | Ref. |
| Sizing composition |  |  |  |  |  |  |  |
| Glucose | 63.4 | 39.7 | 44.1 | 28.6 | 37.1 | 64.0 | — |
| Fructose | — | — | — | — | — | — | — |
| Aluminium sulphate | 3.0 | 3.0 | 3.0 | 1.0 | 2.0 | — | — |
| Copper sulphate | — | — | — | — | — | 3.0 | — |
| Iron(II) sulphate | — | — | — | — | — | — | — |
| Zinc sulphate | — | — | — | — | — | — | — |
| Tetraethylenepentamine (TEPA)[1] | — | 24.3 | — | — | — | 12.1 | — |
| Triethylenetriamine (TETA) | 14.6 | — | — | — | — | — | — |
| Priamine ®[2] | — | 10.4 | 21.5 | — | — | — | — |
| Monoethanolamine | — | — | — | 27.4 | — | — | — |
| Diethanolamine | — | — | — | — | 30.8 | — | — |
| Urea | — | — | — | 16.2 | — | 4.1 | — |
| Maleic anhydride | 18.6 | 25.6 | 28.4 | 44.0 | 28.8 | 16.8 | — |
| Itaconic acid | — | — | — | — | — | — | — |
| Citraconic anhydride | — | — | — | — | — | — | — |
| Fumaric acid | — | — | — | — | — | — | — |
| Properties |  |  |  |  |  |  |  |
| Crosslinking start temp. $T_c$ (° C.) | 141 | 129 | 142 | 174 | 170 | 137 | 151 |
| pH[3] | 3.8 | 3.0 | 3.0 | 2.7 | 3.0 | 2.9 | 6.0 |

[1]Sold by Huntsman (mixture of TEPA (predominant), AETETA, AEPEEDA, PEDETA and BISPIP)
[2]Sold by CRODA under the reference 1074 ($C_{36}$ amine dimer)
[3]solids content: 30%
n.d.: not determined

TABLE 2

|  | Example |  |  |  |  |  |  |
|---|---|---|---|---|---|---|---|
|  | 27 | 28 | 29 | 30 | 31 | 32 | 33 (comparative) |
| Sizing composition | Ex. 1 | Ex. 2 | Ex. 3 | A | B | C | Ref. |
| Properties |  |  |  |  |  |  |  |
| Tensile strength (N/g) |  |  |  |  |  |  |  |
| Initial | 4.0 | 3.1 | 2.3 | 2.7 | 3.3 | 2.4 | 4.5 |
| After ageing (TS 15) | 3.4 | 3.0 | 2.2 | 2.3 | 3.0 | 2.4 | 3.8 |
| Thickness (mm) |  |  |  |  |  |  |  |
| After 1 hour | 82.0 | 81.8 | 82.9 | 80.6 | 80.1 | 80.4 | 82.5 |
| After 30 days | 76.6 | 77.6 | 82.2 | 75.9 | 75.5 | 75.9 | 77.2 |
| λ (W/(m × K)) | 0.034 | 0.034 | 0.034 | 0.034 | 0.034 | 0.034 | 0.034 |

TABLE 3

|  | Example |  |  |  |  |  |  |  |
|---|---|---|---|---|---|---|---|---|
|  | 34 | 35 | 36 | 37 | 38 | 39 | 40 | 41 (comparative) |
| Sizing composition |  |  |  | Ex. 4 | Ex. 5 |  |  | Ref. |
| Glucose | 65.0 | 61.0 | 60.5 | 68.0 | 76.6 | 60.5 | 76.6 | — |
| Aluminium sulphate | 3.0 | — | 10.7 | 12.0 | 13.4 | — | — | — |
| Copper sulphate | — | 10.0 | — | — | — | 10.7 | 13.4 | — |
| Tetraethylenepentamine (TEPA)[1] | 14.0 | 12.6 | 14.1 | 9.8 | 4.9 | 14.1 | 4.9 | — |
| Maleic anhydride | — | — | 14.7 | 10.2 | 5.1 | 14.7 | 5.1 | — |
| Maleic acid | 17.0 | 15.4 | — | — | — | — | — | — |
| Properties |  |  |  |  |  |  |  |  |
| Tensile strength (N/g) |  |  |  |  |  |  |  |  |
| Initial | 3.0 | 2.6 | 2.5 | 1.9 | 1.4 | 2.5 | 2.1 | 3.7 |
| After ageing (TS 15) | 2.6 | 2.2 | 2.1 | 1.8 | 1.5 | 2.1 | 1.4 | 3.3 |

TABLE 3-continued

| | Example | | | | | | | |
|---|---|---|---|---|---|---|---|---|
| | 34 | 35 | 36 | 37 | 38 | 39 | 40 | 41 (comparative) |
| Thickness (mm) | | | | | | | | |
| After 1 hour | 145.9 | 151.2 | 142.9 | 142.7 | 146.1 | 140.3 | 139.7 | 143.2 |
| After 30 days | 99.9 | n.d. | n.d. | 108.7 | 108.4 | 101.0 | 95.5 | 109.8 |

(1)Sold by Huntsman (mixture of TEPA (predominant), AETETA, AEPEEDA, PEDETA and BISPIP)
n.d.: not determined

TABLE 4

| | Example | | | |
|---|---|---|---|---|
| | 42 | 43 | 44 (comp.) | 45 (comp.) |
| Sizing composition | | | | |
| Glucose | 57 | 76 | 57 | 76 |
| Copper sulphate | 10 | 14 | 0.28 | 0.38 |
| Tetraethylenepentamine (TEPA) | 16.2 | 4.9 | 16.2 | 4.9 |
| Maleic anhydride | 16.8 | 5.1 | 16.8 | 5.1 |
| Properties | | | | |
| Crosslinking start temp. $T_c$ (° C.) | 145 | 148 | 175 | 196 |
| pH | 3.3 | 3.0 | 4.0 | 4.5 |

The invention claimed is:

1. Formaldehyde-free sizing composition for fibres, comprising:
   at least one reducing sugar,
   copper sulphate,
   at least one amine selected from the group consisting of monoethanolamine, diethanolamine, diethylenetriamine (DETA), triethylenetetramine (TETA), tetraethylenepentamine (TEPA), pentaethylenehexamine (PEHA), aminoethyltriethylenetetramine (AETETA), N"-(aminoethyl)tetraethylenepentamine and N'-(aminoethyl)tetraethylenepentamine (AETEPA), bis(piperazine)ethylene (BISPIP), aminoethylpiperazinylethylethylenediamine (AEPEEDA), piperazinylethyldiethylenetriamine (PEDETA), aminoethylpiperazinylethyldiethylenetriamine (AEPEDETA), piperazinylethyltriethylenetetramine (PETETA), tris(aminoethyl)aminoethylpiperazine (TRISAEAEP) and piperazinylethylaminoethyldiethylenetriamine (PEAEDETA), and mixtures thereof, and
   at least one compound comprising activated ethylenic unsaturation(s),
   the copper sulphate being present in an amount at least equal to 1% of the weight of the reducing sugar.

2. Composition according to claim 1, wherein the reducing sugar is an oligosaccharide including from 1 to 10 saccharide units.

3. Composition according to claim 2, wherein the reducing sugar is glucose, galactose, mannose, fructose, lactose, maltose, isomaltose or cellobiose.

4. Composition according to claim 3, wherein the reducing sugar is glucose or fructose.

5. Composition according to claim 1, wherein the amount of copper sulphate represents from 1 to 30% of the weight of the reducing sugar.

6. Composition according to claim 1, wherein the amine is diethylenetriamine (DETA), triethylenetetramine (TETA), tetraethylenepentamine (TEPA) and mixtures of abovementioned amines in which TEPA is predominant.

7. Composition according to claim 1, wherein the compound comprising activated ethylenic unsaturation(s) corresponds to the following formula (IV):

$$\begin{array}{c} R_5 \\ \diagdown \\ R_4 \end{array} C = C \begin{array}{c} R_6 \\ \diagup \\ \diagdown \\ C \\ \parallel \\ O \end{array} R_3 \qquad (IV)$$

in which:
   $R_3$ represents a hydrogen atom, a $C_1$-$C_5$ alkyl group, a hydroxyl group or a $C_1$-$C_5$ alkoxy group,
   $R_4$ and $R_5$, which are identical or different, represent a hydrogen atom, a $C_1$-$C_5$ alkyl group or a —CO—$R_3$ group,
   $R_6$ represents a hydrogen atom or a hydrocarbon chain which can include one or more heteroatoms.

8. Composition according to claim 7, wherein the compound is acrylic acid, methacrylic acid, crotonic acid, fumaric acid, maleic acid, citraconic acid, itaconic acid and the anhydrides of these acids.

9. Composition according to claim 1, wherein the amount of amine in the composition is such that a molar ratio of the compound comprising activated ethylenic unsaturation(s) to the amine varies from 1 to 3.5.

10. Composition according to claim 1, wherein the amount of compound comprising activated ethylenic unsaturation(s) in the composition is such that a molar ratio of the compound to the sum of the constituent saccharide units of the reducing sugar varies from 0.05 to 1.5.

11. Composition according to claim 1, further comprising the additives below in the following proportions, calculated on the basis of 100 parts by weight of reducing sugar, copper sulphate, amine and compound comprising activated ethylenic unsaturation(s):
   from 0 to 2 parts of silane,
   from 0 to 20 parts of oil,
   from 0 to 5 parts of a silicone,
   from 0 to 30 parts of an extender.

* * * * *